(12) United States Patent
Graney, IV et al.

(10) Patent No.: US 10,018,027 B2
(45) Date of Patent: Jul. 10, 2018

(54) NATURAL GAS APPARATUS AND METHOD FOR IN-SITU PROCESSING

(71) Applicant: NACELLE LOGISTICS LLC, Charleston, WV (US)

(72) Inventors: Patrick C. Graney, IV, Charleston, WV (US); Gouverneur C. M. Graney, Charleston, WV (US)

(*) Notice: Subject to any disclaimer, the term of this patent is extended or adjusted under 35 U.S.C. 154(b) by 313 days.

(21) Appl. No.: 15/062,955

(22) Filed: Mar. 7, 2016

(65) Prior Publication Data
US 2017/0254188 A1    Sep. 7, 2017

(51) Int. Cl.
| E21B 43/34 | (2006.01) |
| C10L 3/10 | (2006.01) |
| B01D 46/42 | (2006.01) |
| B01D 53/22 | (2006.01) |
| B01D 46/00 | (2006.01) |
| B01D 46/44 | (2006.01) |

(52) U.S. Cl.
CPC .......... E21B 43/34 (2013.01); B01D 46/0027 (2013.01); B01D 46/4263 (2013.01); B01D 46/448 (2013.01); B01D 53/229 (2013.01); C10L 3/101 (2013.01); B01D 2053/221 (2013.01); C10L 2290/46 (2013.01); C10L 2290/547 (2013.01); C10L 2290/548 (2013.01); C10L 2290/567 (2013.01)

(58) Field of Classification Search
CPC ......... Y02C 10/10; E21B 43/34; E21B 43/00; C01B 2203/0405
See application file for complete search history.

(56) References Cited

U.S. PATENT DOCUMENTS

| 3,936,283 | A | 2/1976 | Solis |
| 4,857,078 | A | 8/1989 | Watler |
| 5,071,451 | A | 12/1991 | Wijmans |
| 6,572,678 | B1 | 6/2003 | Wijmans |
| 6,630,011 | B1 | 10/2003 | Baker |
| 6,653,005 | B1 | 11/2003 | Muradov |
| 7,100,692 | B2 | 9/2006 | Parsley |
| 7,510,594 | B2 | 3/2009 | Wynn |
| 7,537,641 | B2 | 5/2009 | Lokhandwala |
| 7,562,708 | B2 | 7/2009 | Cogliandro |
| 7,650,939 | B2 | 1/2010 | Zubrin |

(Continued)

*Primary Examiner* — Imran Akram
(74) *Attorney, Agent, or Firm* — Andrew W. Lundy

(57) ABSTRACT

A natural gas processing system is mounted on a mobile platform that is transported to a natural gas source, such as a well. A liquid removal tank separates liquid contaminants from the gas. A particulate filter removes particulates from the gas. A membrane separates the natural gas into a retentate gas and a permeate gas. A gas compressor, powered by the natural gas, is selectively connected either upstream of the membrane or downstream of the membrane. For low pressure source gas, the upstream connection will compress the natural gas before entering the membrane. For high pressure source gas, the downstream connection will compress the natural gas after exiting the membrane. An electrical generator and an air compressor are provided. A process control is connected to all the valves in the system, all instruments, the gas compressor, the electrical generator, and the air compressor. The process control monitors and controls the natural gas processing system.

24 Claims, 9 Drawing Sheets

(56) References Cited

U.S. PATENT DOCUMENTS

| | | |
|---|---|---|
| 7,654,330 B2 | 2/2010 | Zubrin |
| 7,753,972 B2 | 7/2010 | Zubrin |
| 7,758,670 B2 | 7/2010 | Wynn |
| 7,810,565 B2 | 10/2010 | Zubrin |
| 7,896,170 B2 | 3/2011 | Bjerkreim |
| 7,918,906 B2 | 4/2011 | Zubrin |
| 7,918,921 B2 | 4/2011 | Wynn |
| 7,938,893 B2 | 5/2011 | Doong |
| 8,002,033 B2 | 8/2011 | Calderon |
| 8,100,076 B1 * | 1/2012 | Shivers, III ............ B63B 27/24 114/230.14 |
| 8,141,718 B2 | 3/2012 | Biester |
| 8,273,151 B2 | 9/2012 | Miotto |
| 8,506,680 B2 | 8/2013 | Zhang |
| 8,574,351 B2 | 11/2013 | Elms |
| 8,906,143 B2 | 12/2014 | Lokhandwala |
| 8,926,739 B2 | 1/2015 | Morgan |
| 8,945,276 B2 | 2/2015 | Wynn |
| 2005/0061514 A1 | 3/2005 | Hopper |
| 2005/0115248 A1 * | 6/2005 | Koehler ................ F17C 1/002 62/53.1 |
| 2006/0174762 A1 | 8/2006 | Kaschemekat |
| 2007/0125537 A1 * | 6/2007 | Lokhandwala ........ B01D 53/22 166/291 |
| 2007/0272079 A1 * | 11/2007 | Malsam ............... B01D 53/226 95/51 |
| 2008/0127673 A1 * | 6/2008 | Bowen .................... F17C 5/00 62/611 |
| 2009/0193884 A1 * | 8/2009 | Moore ................. E21B 49/008 73/152.23 |
| 2010/0186586 A1 * | 7/2010 | Chinn ................... B01D 53/22 95/45 |
| 2012/0000359 A1 * | 1/2012 | Bresler ................. B01D 53/75 95/51 |
| 2013/0019633 A1 * | 1/2013 | Pierce ................. B01D 53/002 62/618 |
| 2013/0263624 A1 * | 10/2013 | Vandor ................. F25J 1/0022 62/611 |

* cited by examiner

HIGH PRESSURE SOURCE GAS

HIGH PRESSURE SOURCE GAS

LOW PRESSURE SOURCE GAS

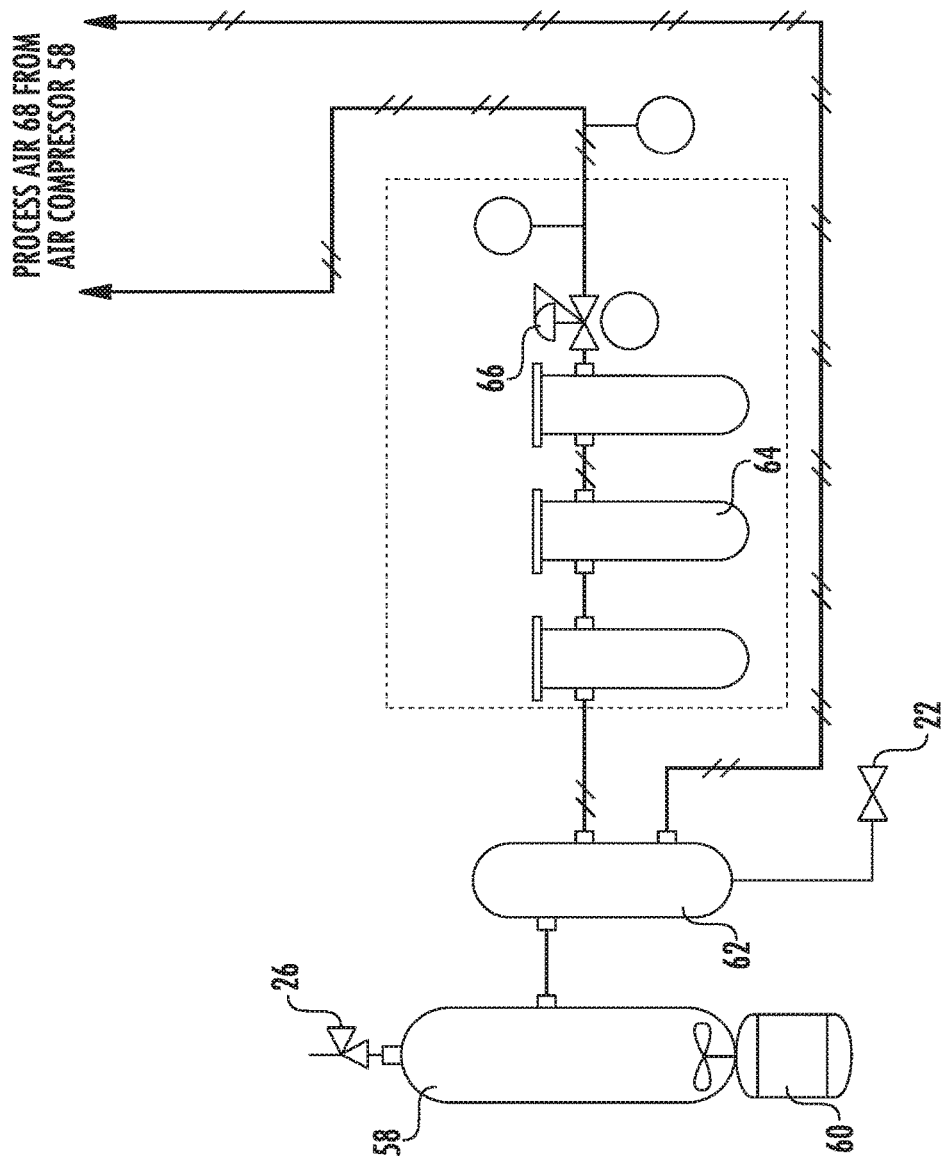

NATURAL GAS APPARATUS AND METHOD FOR IN-SITU PROCESSING

INCORPORATION BY REFERENCE

Not applicable.

TECHNICAL FIELD

The presently disclosed technologies are directed to an apparatus and method that processes natural gas, and in particular, a transportable apparatus for processing natural gas at the wellhead.

BACKGROUND

It is often uneconomical or impractical to capture and transport natural gas in a special pipeline from the wellhead to a refinery. In these cases the gas is flared off, or burned. It is thus wasted, both as a source of energy and as a valuable commodity.

In those instances where a pipeline is built, other problems develop. Natural gas at the wellhead usually contains impurities such as carbon dioxide ($CO_2$), and hydrogen sulfide ($H_2S$). When dissolved in water, $CO_2$ is known as carbonic acid. Similarly, $H_2S$ becomes hydrosulfuric acid. Either of these acids will cause corrosion problems in pipelines and related equipment during transportation of natural gas.

The natural gas product at retail comprises almost pure methane, but raw natural gas from the wellhead contains a variety of contaminants. In addition to the $CO_2$ and $H_2S$, other gases such as nitrogen and carbon dioxide may be found in oil and gas wells. Solid impurities include sand and dirt from the reservoir; and scale and corrosion products from the piping. The wells produce a mixture of hydrocarbon gas, condensate, or oil; and water with dissolved minerals such as salt. The oil and gas is processed to separate these components.

Natural gas condensate is a mixture of hydrocarbon liquids that are gaseous components of the natural gas produced by natural gas fields. It condenses from the raw gas if the temperature drops below the dew point. The condensate gas includes mostly ethane, propane, butane and pentanes. These components are separated and sold.

Membranes are often used to separate raw gas into components. Each component permeates through the membrane at a different rate. The components such as $CO_2$ and $H_2S$ and water will permeate faster through the membrane than components such as $N_2$ and methane. Thus, the feed stream is separated into retentate, which is mostly methane-rich natural gas and is depleted of heavy hydrocarbons; and permeate, which includes $CO_2$, $H_2S$, water, and heavier hydrocarbons described above as condensate gas.

Membranes are typically non-porous polymeric films. The most commonly used polymers for this purpose are polycarbonate, polysulfone, polyimide, and cellulose acetate. Membranes are produced in various configurations, such as flat sheets, spiral wound sheets, or hollow fibers. Hollow fibers are preferred due to having the highest packing density, meaning greatest membrane area per unit volume.

Some limited processing of raw natural gas is often carried out at the well site. However, the complete processing of natural gas is typically carried out at a centralized process plant, or refinery. Gas from the wellhead is transported by pipeline or tanker vehicle to the refinery.

There are benefits for oil and gas companies to utilize natural gas on site to power engines, rather than trucking in diesel fuel or gasoline. Such engines, for example, would power drilling rigs or pump trucks during fracking. Using refined products, such as LNG or CNG, requires offsite processing, trucking and specialized equipment to deliver the fuel to the site. On site natural gas is source or field gas from a well or pipeline. The benefits include cost savings, employee safety, and less environmental disturbance.

Natural gas engines maintain the best performance and require the least maintenance when utilizing a dry, consistent BTU gas delivered at an optimal pressure and temperature. Various engine manufacturers spec different ideal BTU ranges but typically 1000 to 1100 BTU is the prime range that balances horsepower required to do the job with engine and exhaust heat that causes engine and maintenance issues. It is not economical to develop a pipeline infrastructure to a well pad for pre-processed gas to power engines.

Accordingly, there is a need to provide a system that is transportable to the wellhead site, and that is self-contained, and is capable of processing of raw natural gas of varying quality found at the gas source.

There is a further need to provide a system of the type described, and that can selectively process either low pressure or high pressure source gas.

There is a still further need to provide a system of the type described, and that is capable of being powered by fuels recovered at the wellhead.

SUMMARY

In one aspect, a natural gas processing system is used in connection with a natural gas source and raw source natural gas produced by the source. The natural gas processing system comprises a mobile platform that can be transported to the natural gas source. A liquid removal tank is juxtaposed with the mobile platform. The liquid removal tank is adapted for attachment in fluid communication to the natural gas source. The liquid removal tank receives the source natural gas. The liquid removal tank separates liquid contaminants from the source natural gas. The liquid removal tank allows passage of the natural gas through the tank.

A particulate filter is mounted on the mobile platform. The particulate filter is connected in fluid communication with the liquid removal tank. The particulate filter removes particulate matter from the natural gas. The particulate filter allows passage of the natural gas through the filter.

A membrane is mounted on the mobile platform. The membrane is connected in fluid communication with the natural gas source. The membrane separates the natural gas into a retentate gas and a permeate gas. The membrane allows passage of the retentate gas and the permeate gas through the membrane.

A gas compressor is mounted on the mobile platform. The gas compressor is connected in fluid communication with the membrane. The gas compressor compresses the natural gas and allows passage of the natural gas through the gas compressor. The gas compressor is driven by a first power source.

A source natural gas valve is connected in fluid communication with the natural gas source and the liquid removal tank. The source natural gas valve controls the source natural gas entering the natural gas processing system.

A retentate valve is connected in fluid communication with the membrane. The retentate valve controls the retentate gas exiting the natural gas processing system.

A process control is operatively connected to the natural gas processing system for controlling the natural gas processing system.

In another aspect, a natural gas processing system is used in connection with a natural gas source and raw source natural gas produced by the source. The natural gas processing system comprises a mobile platform that can be transported to the natural gas source. A liquid removal tank is juxtaposed with the mobile platform. The liquid removal tank is adapted for attachment in fluid communication to the natural gas source. The liquid removal tank receives the source natural gas. The liquid removal tank separates liquid contaminants from the source natural gas. The liquid removal tank allows passage of the natural gas through the tank.

A source natural gas valve is connected in fluid communication with the natural gas source and the liquid removal tank. The source natural gas valve controls the source natural gas entering the natural gas processing system.

A particulate filter is mounted on the mobile platform. The particulate filter is connected in fluid communication with the liquid removal tank. The particulate filter removes particulate matter from the natural gas. The particulate filter allows passage of the natural gas through the filter.

A membrane is mounted on the mobile platform. The membrane is connected in fluid communication with the natural gas source. The membrane separates the natural gas into a retentate gas and a permeate gas. The membrane allows passage of the retentate gas and the permeate gas through the membrane.

A retentate valve is connected in fluid communication with the membrane. The retentate valve controls the retentate gas exiting the natural gas processing system.

A gas compressor is mounted on the mobile platform. The gas compressor is connected in fluid communication with the membrane. The gas compressor compresses the natural gas. The gas compressor allows passage of the natural gas through the gas compressor. The gas compressor is powered by the natural gas. The gas compressor is adapted for selective connections upstream of the membrane and downstream of the membrane.

The gas compressor is selectively connected in fluid communication with the membrane in a one of two ways. One connection is upstream of the membrane so as to compress the natural gas before entering the membrane. This is in the event that a pressure of the source natural gas entering the natural gas processing system is less than a predetermined pressure which will be defined hereinbelow.

The alternative connection is downstream of the membrane so as to compress the natural gas after exiting the membrane. This is in the event that the pressure of the source natural gas entering the natural gas processing system is greater than the predetermined pressure.

An electrical generator is juxtaposed with the mobile platform. The generator supplies process electricity. The electrical generator is powered by the natural gas.

An air compressor is mounted on the mobile platform for supplying process compressed air. The air compressor is operatively connected to the electrical generator. The air compressor is powered by electricity from the electrical generator.

A process control is operatively connected to the source natural gas valve, the retentate valve, the gas compressor, the electrical generator, and the air compressor. The process control controls the natural gas processing system. The selective connections are controlled by the process control.

In still another aspect, a method is disclosed for processing natural gas. The method is used in connection with a natural gas source and raw source natural gas produced by the source. The method comprises providing a mobile platform. A liquid removal tank is juxtaposed with the mobile platform. A particulate filter is mounted on the mobile platform. The particulate filter is connected in fluid communication with the liquid removal tank.

A membrane is mounted on the mobile platform. The membrane is connected in fluid communication with the natural gas source. A gas compressor is mounted on the mobile platform. The gas compressor is connected in fluid communication with the membrane. The natural gas is compressed with the gas compressor. The natural gas is allowed to pass through the gas compressor.

An electrical generator is juxtaposed with the mobile platform. Process electricity is supplied with the electrical generator. An air compressor is mounted on the mobile platform. Process compressed air is supplied with the air compressor.

The mobile platform is transported to the natural gas source. The liquid removal tank is connected in fluid communication to the natural gas source. The liquid removal tank receives the source natural gas. A source natural gas valve is connected in fluid communication with the natural gas source and the liquid removal tank. The source natural gas entering the liquid removal tank is controlled with the source natural gas valve.

Liquid contaminants are separated from the source natural gas with the liquid removal tank. The natural gas is allowed to pass through the liquid removal tank. Particulate matter is removed from the natural gas with the particulate filter. The natural gas is allowed to pass through the particulate filter.

The natural gas is separated into a retentate gas and a permeate gas with the membrane. The retentate gas and the permeate gas are allowed to pass through the membrane. A retentate valve is connected in fluid communication with the membrane. The retentate gas is controlled with the retentate valve.

A process control is connected operatively to the source natural gas valve, the retentate valve, the gas compressor, the electrical generator, and the air compressor. The natural gas processing is controlled with the process control.

These and other aspects, objectives, features, and advantages of the disclosed technologies will become apparent from the following detailed description of illustrative embodiments thereof, which is to be read in connection with the accompanying drawings.

BRIEF DESCRIPTION OF THE DRAWINGS

FIG. 9 is a piping and instrumentation diagram of the air compressor used with the natural gas processing system of FIG. 1.

It should be noted that the drawings herein are not to scale

DETAILED DESCRIPTION

Describing now in further detail these exemplary embodiments with reference to the Figures as described above, the natural gas processing system is typically used to process natural gas sourced from a well or a pipeline. However, the source is non-limiting, and can be a truck tanker, a marine tanker, a stationary storage tank, or any source.

As used herein, a "processing assembly" or "processing system" refers to one or more devices used to condition or transform or process natural gas into another form or product.

As used herein, "natural gas" refers to raw source natural gas, or refined natural gas, or a gaseous fuel product in any stage of processing from the source to the finished product ready to ship.

As used herein, the term "process" refers to a procedure of moving or transporting a raw source natural gas, or a refined natural gas, or a gaseous fuel product, and converting the natural gas into a gaseous fuel product in any stage of processing. The "flow path" is the conduit through which the natural gas moves during the process. The natural gas moves in a "process direction" along the flow path, shown by arrows 80.

As used herein, a "membrane" is a film material that serves as a permselective barrier or interface between two or more natural gas phases. Separation happens due to one or more of the natural gas components in the raw source natural gas passing through the membrane more easily and quickly than the remaining components.

As used herein, "retentate" gas is a refined natural gas product comprised mostly of methane, and does not pass easily through the membrane. As used herein, "permeate" is the gas that has permeated or passed through the membrane, which includes contaminants, as well as gaseous fuel products which are marketed.

Figure 1:
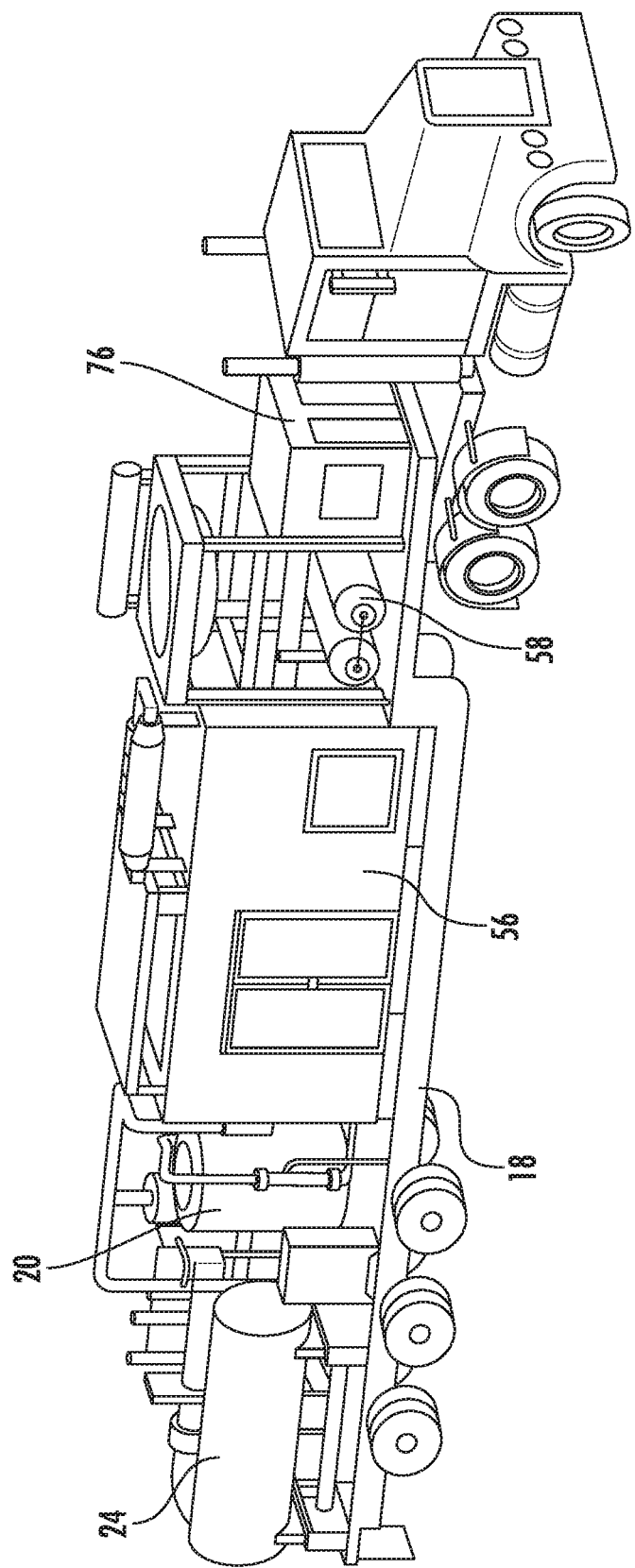
FIG. 1 is a right side perspective view of a natural gas processing system constructed in accordance with the invention.
Figure 2:
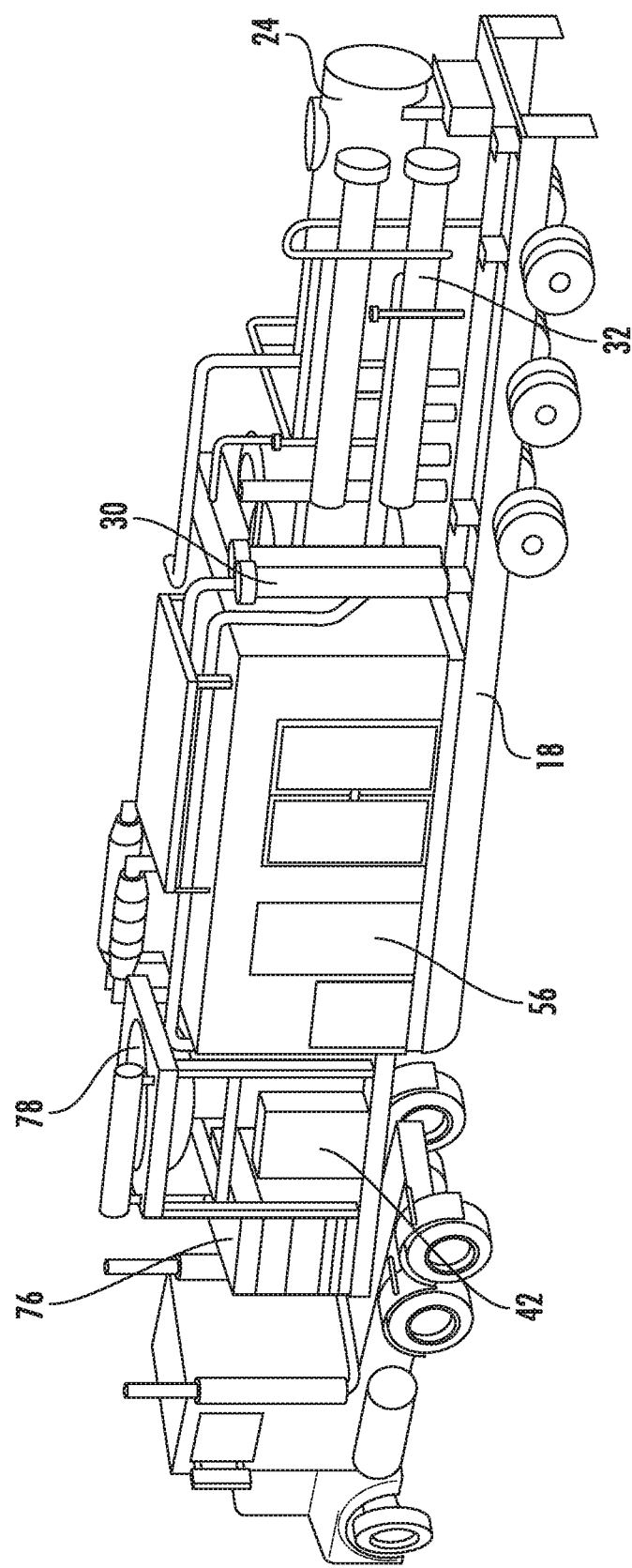
FIG. 2 is a left side perspective view of the natural gas processing system of FIG. 1.
Figure 3:
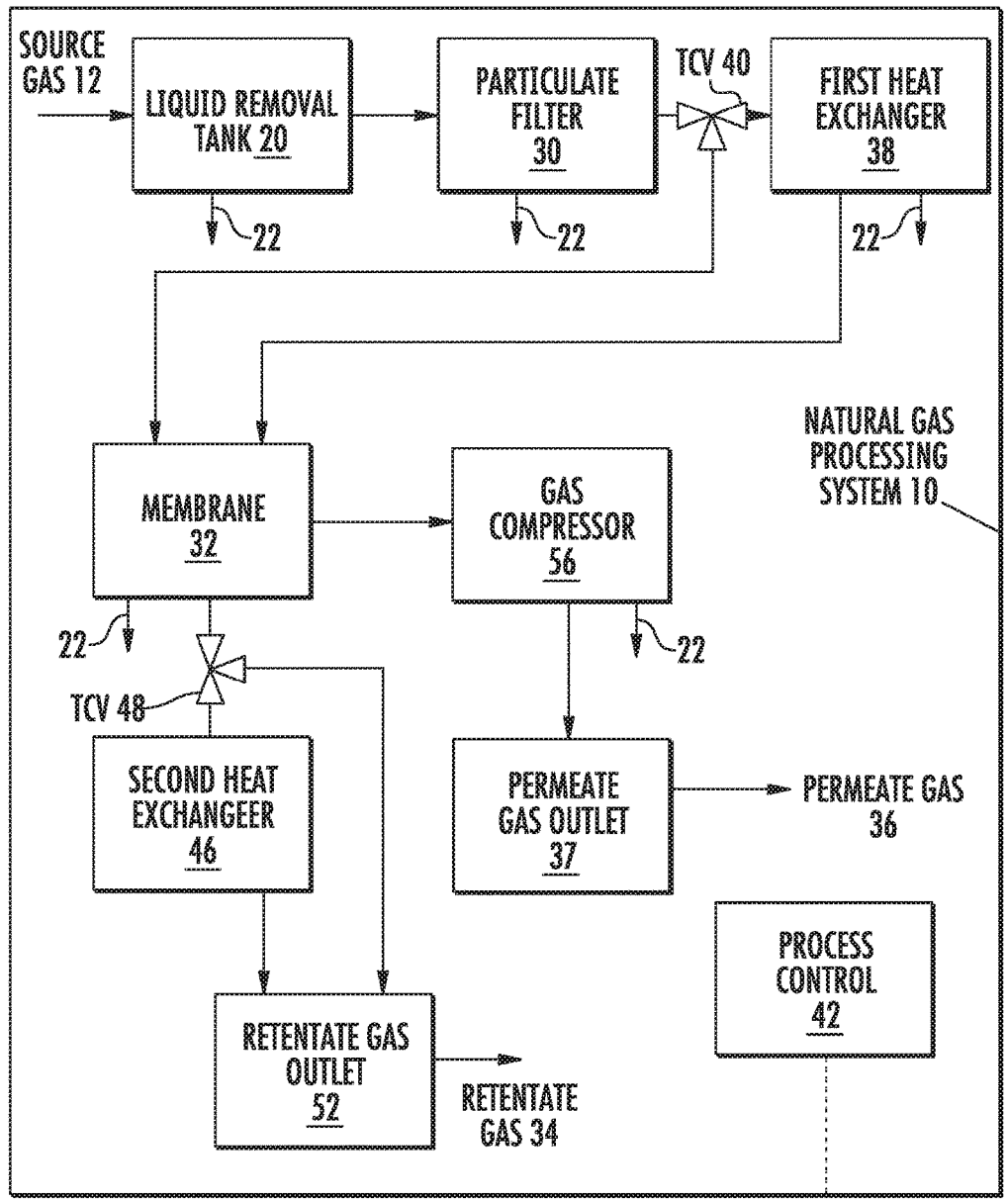
FIG. 3 is a flow diagram of the natural gas processing system of FIG. 1.
Figure 4:
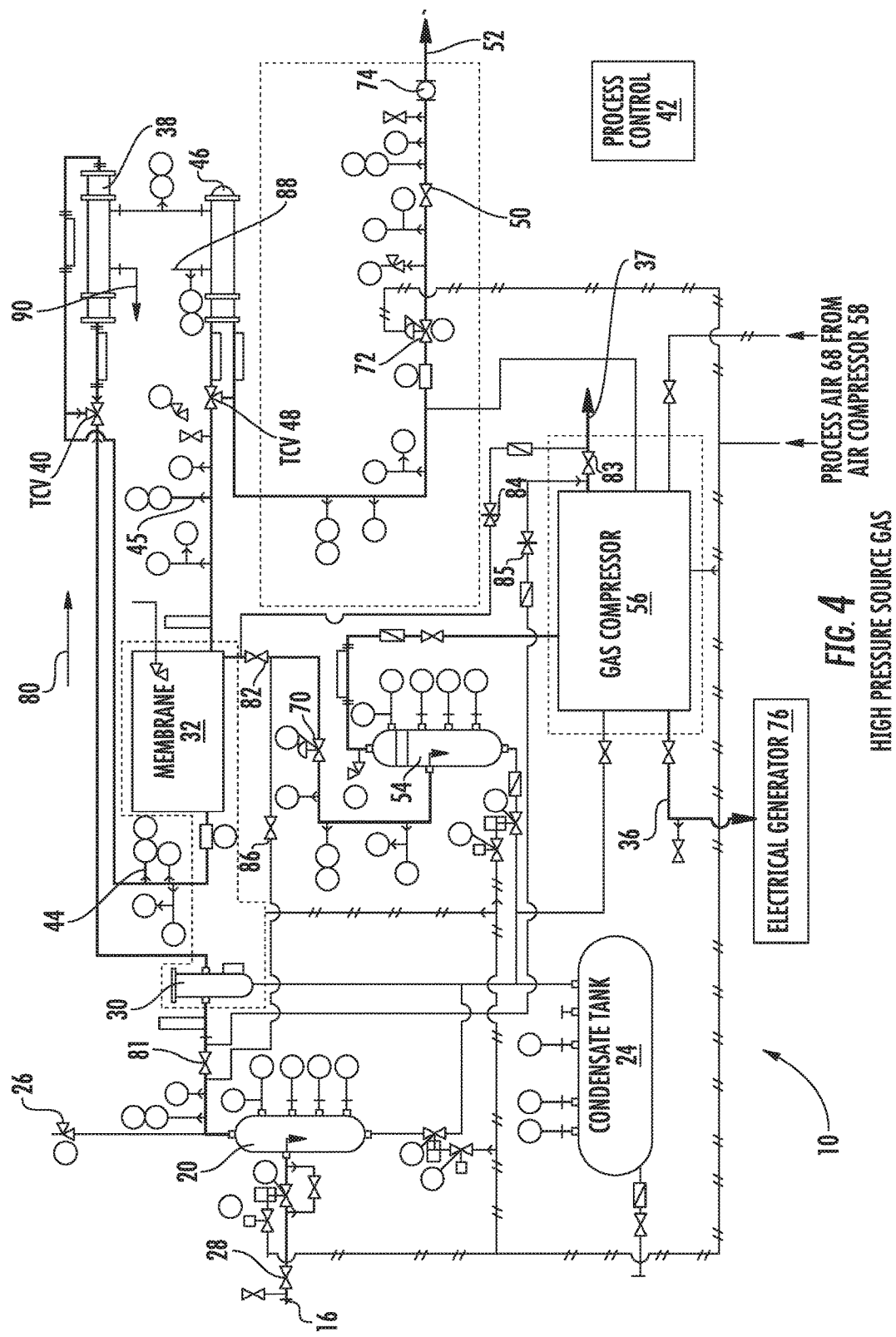
FIG. 4 is a piping and instrumentation diagram of the natural gas processing system of FIG. 1, and configured for use with high pressure source natural gas.
Figure 5:
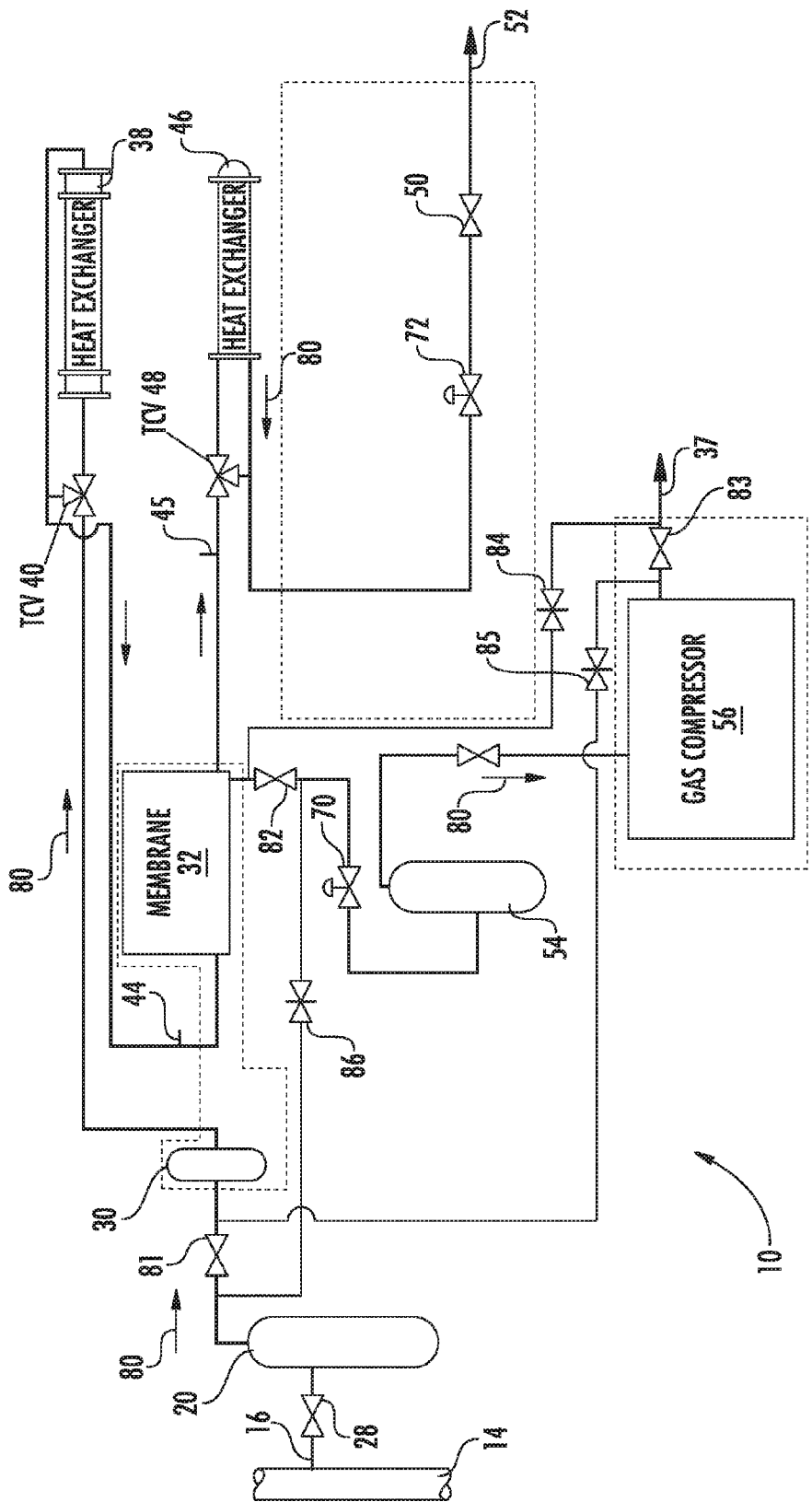
FIG. 5 is a simplified view of the piping and instrumentation diagram of FIG. 4, and showing the natural gas flow through major components.
Figure 6:
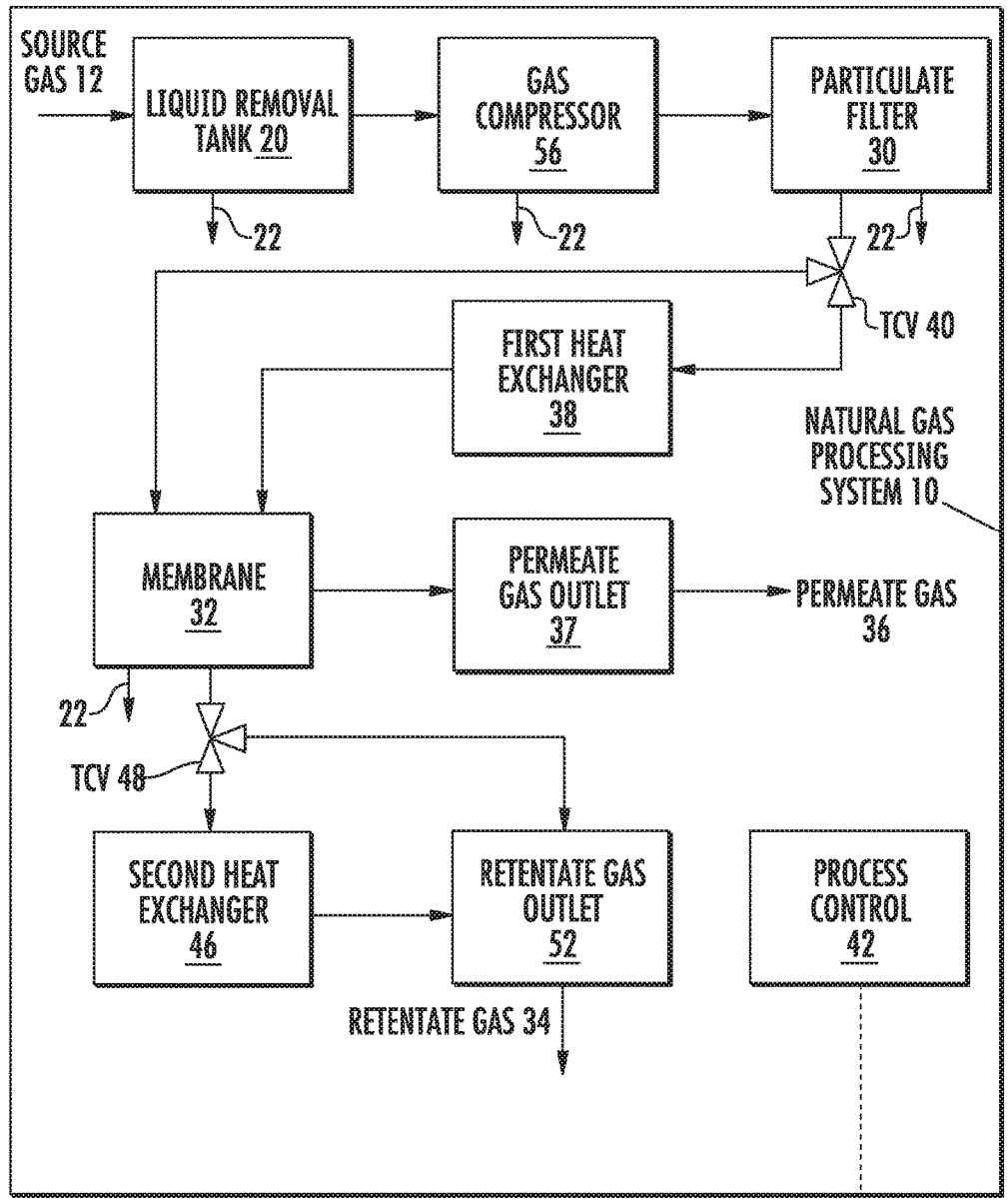
FIG. 6 is a flow diagram of the natural gas processing system of FIG. 1, and configured for use with low pressure source natural gas.
Figure 7:
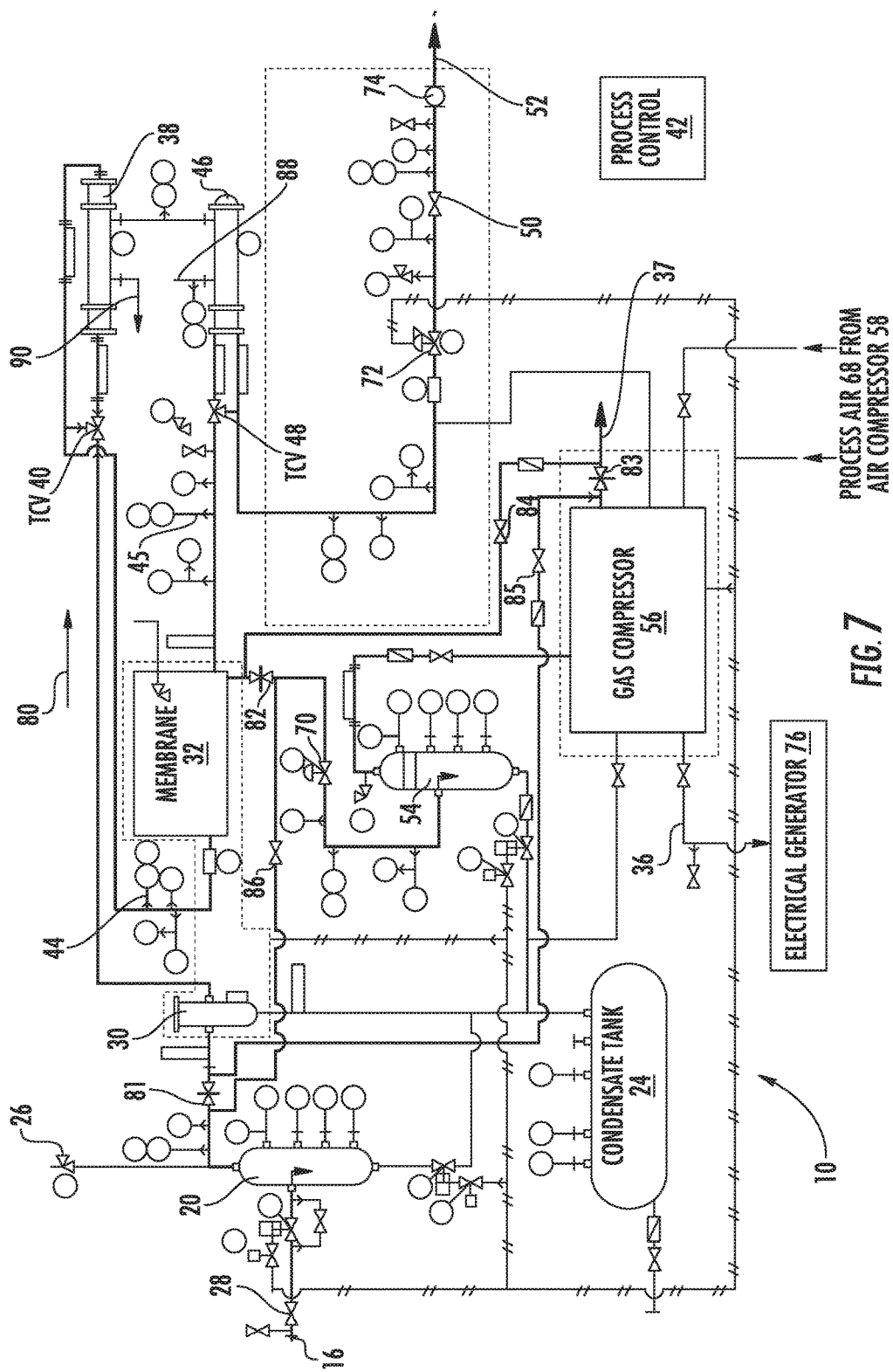
FIG. 7 is a piping and instrumentation diagram of the natural gas processing system of FIG. 1, and configured for use with low pressure source natural gas.
Figure 8:
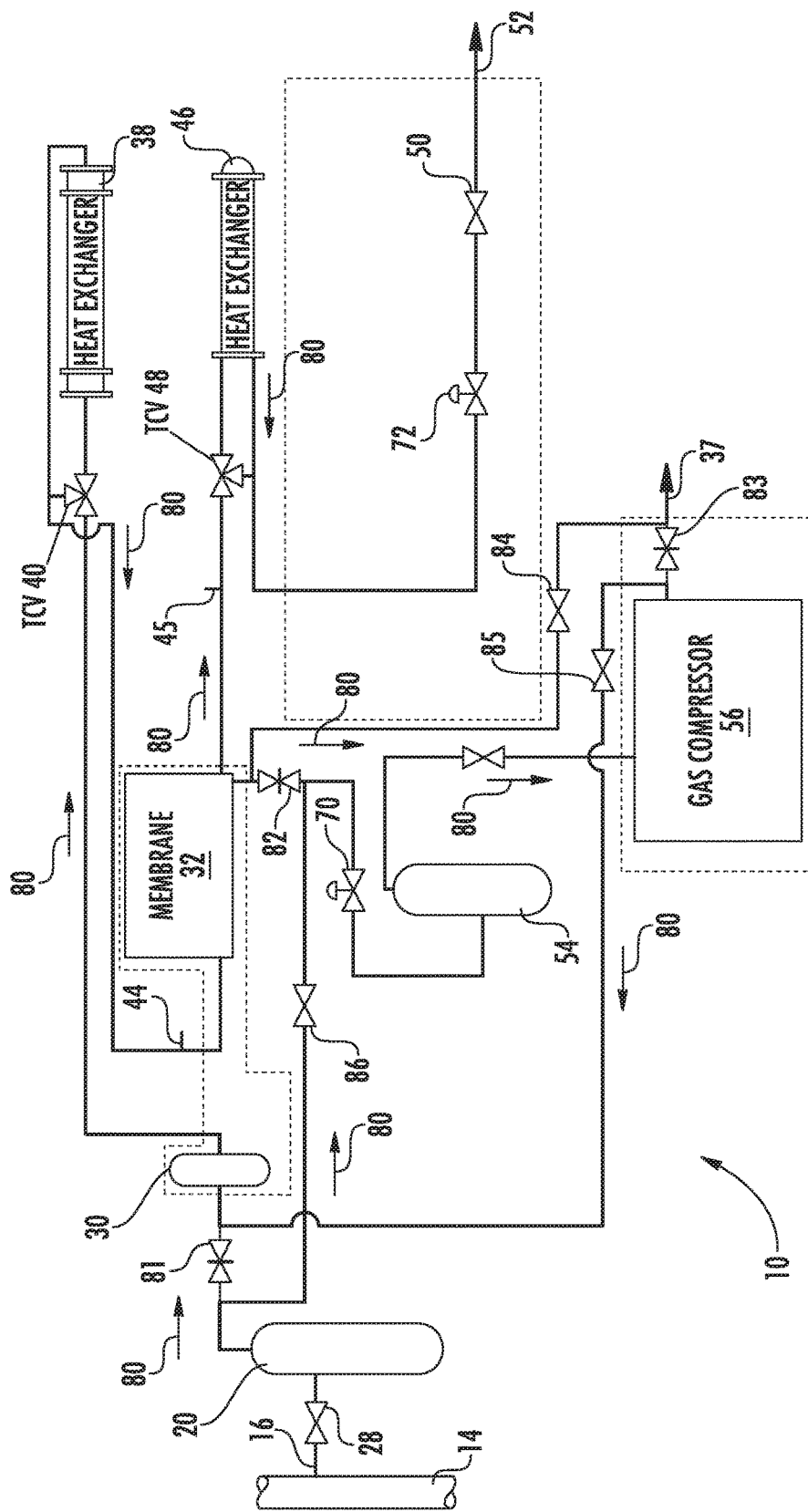
FIG. 8 is a simplified view of the piping and instrumentation diagram of FIG. 7, and showing the natural gas flow through major components.

This disclosure is one embodiment of the invention that adapts from using high-pressure to using low-pressure source natural gas by adjusting valves. FIGS. 3-5 show the system configured for a high-pressure raw source natural gas 12. FIGS. 6-8 show the system configured for a low-pressure raw source natural gas 12. Referring to the drawing FIGS. 1-9, a natural gas processing system is shown at 10. The system 10 is used in connection with a natural gas source 14 which typically comprises, but is not limited to, a natural gas well or a natural gas pipeline. Raw source natural gas 12 is produced by the source 14. The raw source gas 12 enters the system through natural gas inlet 16. The natural gas processing system 10 comprises a mobile platform 18 that can be transported to the natural gas source 14. The mobile platform 18 is typically a trailer or a skid, but is not limited to these structures. The mobile platform 18 can be any structure capable of receiving and mounting equipment and of being transported to the site of the natural gas source 14. FIGS. 1 and 2 show a trailer mobile platform 18.

A liquid removal tank 20 is juxtaposed with the mobile platform 18. The liquid removal tank 20 is typically mounted on the mobile platform 18, but can be mounted on a separate skid alongside the mobile platform 18. The liquid removal tank 20 is attached in fluid communication to the natural gas source 14, and receives the raw source gas 12. The liquid removal tank 20 separates liquid contaminants such as water from the raw source gas 12. The liquid removal tank 20 also provides settling out of some solids such as dirt and rust particles. The liquid removal tank 20 allows passage of the natural gas through the tank.

A drain connection 22 with associated piping is attached to the bottom of the liquid removal tank 20. The drain 22 is also found on major components throughout the system. All drains 22 typically connect to a condensate tank 24, which is in turn drained periodically. The by-product condensate, mostly water, can also be pumped back into a liquids line if the customer utilizes one in their operation.

A vent connection 26 with associated piping is attached to the top of the liquid removal tank 20. The vent 26 is also found on major components throughout the system. All vents 26 typically bleed gases to the atmosphere through a relief valve.

A source natural gas valve 28 is connected in fluid communication with the natural gas source 14 and the liquid removal tank 20. The source natural gas valve 28 controls the raw source gas 12 entering the natural gas processing system 10.

A particulate filter 30 is mounted on the mobile platform 18. The particulate filter 30 is connected in fluid communication with the liquid removal tank 20. The particulate filter 30 removes particulate matter from the natural gas. The particulate filter 30 also removes some of the water vapor. The particulate filter 30 allows passage of the natural gas through the particulate filter 30.

A membrane 32 is mounted on the mobile platform 18. The membrane 32 is connected in fluid communication with the natural gas source 14. The membrane 32 separates the natural gas into a retentate gas 34 and a permeate gas 36. The membrane 32 allows passage of the permeate gas 36 through the membrane 32. The membrane 32 restricts passage of the retentate gas 34 through the membrane 32.

A retentate valve 50 is connected in fluid communication with the membrane 32. The retentate valve 50 controls the retentate gas 34 exiting the natural gas processing system 10. A retentate gas outlet 52 allows the retentate gas 34 to exit the natural gas processing system 10.

A process control 42 is provided which controls the natural gas processing system 10. The process control 42 includes a central processor, a memory, and input and output connections. Input signals are received from instruments throughout the system. Input signals comprise temperature, pressure, and flow at various critical points of the system. Input signals further comprise electrical voltage and current. Output signals are sent to pressure control valves, temperature control valves, and emergency shutdown systems. Shutdown can be initiated from the mobile platform 18 or from an outside source. Control Logic is programmed to monitor the entire process and is able to provide operator ease of use and real time process status updates.

A first heat exchanger 38 is mounted on the mobile platform 18. The first heat exchanger 38 is connected in fluid communication with the membrane 32, and is upstream of the membrane 32. The first heat exchanger 38 changes the temperature of the natural gas entering the membrane 32. Typically, the first heat exchanger 38 will increase the temperature of the natural gas.

A first temperature control valve 40 is connected in fluid communication with the first heat exchanger 38 and the membrane 32. The first temperature control valve 40 is upstream of the first heat exchanger 38. The first temperature control valve 40 controls the temperature of the natural gas entering the membrane 32. The first temperature control valve 40 is operatively connected to the process control 42.

The first temperature control valve 40 proportionately divides the flow of the natural gas between the first heat exchanger 38 and the membrane 32 in proportion to the temperature of the natural gas entering the first temperature control valve 40. A first temperature sensor 44 upstream of the membrane 32 determines the temperature of the natural gas at that point. The sensor signal is sent to the process control 42, which in turn adjusts the first temperature control valve 40 to divert more flow or less flow to the first heat exchanger 38. The balance of the flow bypasses the first heat exchanger 38. In this manner, the temperature of the natural gas entering the membrane 32 is thereby controlled within the limits of 80 F-140 F. Preferably, the natural gas enters the membrane at 120 F, which is the optimal pre-membrane temperature for system efficiency.

The particulate filter 30 is connected upstream of the first temperature control valve 40. The particulate filter 30 can be located anywhere upstream of the membrane 32, as it protects the membrane from contaminants.

A second heat exchanger 46 is mounted on the mobile platform 18. The second heat exchanger 46 is connected in fluid communication with the membrane 32 and is downstream of the membrane 32. The second heat exchanger 46 changes the temperature of the natural gas downstream of the membrane 32. Typically, the second heat exchanger 46 will increase the temperature of the natural gas, which is retentate gas 34 exiting the system at the retentate gas outlet 52.

Hot coolant from the gas compressor 56 enters the second heat exchanger 46 at the fluid entry 88. Fluid then travels to the first heat exchanger 38. Fluid leaves by fluid exit 90 to be cooled by water cooler 78 and returns to the gas compressor 56.

Retentate gas 34 flows downstream toward the second heat exchanger 46. A second temperature control valve 48 is connected in fluid communication with the membrane 32 and the second heat exchanger 46. The second temperature control valve 48 is upstream of the second heat exchanger 46. The second temperature control valve 48 controls the temperature of the natural gas downstream of the membrane 32. Thus, the second temperature control valve 48 controls the temperature of the retentate gas 34 exiting the natural gas processing system 10. The second temperature control valve 48 is operatively connected to the process control 42.

The second temperature control valve 48 proportionately divides the flow of the natural gas between the second heat exchanger 46 and the retentate valve 50 in proportion to the temperature of the natural gas entering the second temperature control valve 48. A second temperature sensor 45 upstream of the retentate gas outlet 52 determines the temperature of the natural gas at that point. The sensor signal is sent to the process control 42, which in turn adjusts the second temperature control valve 48 to divert more flow or less flow to the second heat exchanger 46. The balance of the flow bypasses the second heat exchanger 46. In this manner, the temperature of the retentate gas 34 exiting the retentate gas outlet 52 is thereby controlled.

The temperature of retentate gas 34 exiting the natural gas processing system 10 will depend upon how the customers operations and manifold piping system is set up as well as ambient temperature. The retentate gas 34 is used to power auxiliary equipment such as the gas compressor 56. The engine driving the gas compressor requires fuel gas at approximately 70-90 F. Thus, the temperature of retentate gas 34 typically is adjusted within a range of approximately 50-120 F.

A gas compressor 56 is mounted on the mobile platform 18. The gas compressor 56 is connected in fluid communication with the membrane 32. The gas compressor 56 compresses the natural gas. The gas compressor 56 allows passage of the natural gas through the gas compressor 56. The gas compressor 56 is powered by the natural gas. More particularly, the gas compressor 56 is driven by an engine or turbine (not shown), which is powered by the natural gas. Typically, the gas compressor will require an engine of approximately 600 hp. The gas compressor and engine or turbine combination 56 is well known by those skilled in the art. The gas compressor 56 is adapted for selective connections upstream of the membrane 32 and downstream of the membrane 32. The gas compressor 56 is cooled by water cooler 78.

A novel feature of the present invention allows the natural gas processing system 10 to adapt to either low pressure or high pressure raw source gas 12. The gas compressor 56 can be selectively connected upstream of the membrane 32 and closed to flow downstream of the membrane 32 in the case of low pressure raw source gas 12. Alternatively, the gas compressor 56 can be selectively connected downstream of the membrane 32 and closed to flow upstream of the membrane 32 in the case of high pressure raw source gas 12.

Low pressure raw source gas 12 enters the system at below a critical predetermined pressure. Low pressure raw source gas 12 must be boosted in pressure early in the process in order to maintain a pressure drop across the membrane 32 sufficient to separate the permeate gas 36 from the retentate gas 34. To achieve this, process first valve 81, process second valve 82, and process third valve 83, are closed. At the same time, process fourth valve 84, process fifth valve 85, and process sixth valve 86, are open. This selectively connected valve arrangement routes the natural gas through the gas compressor 56 before entering the membrane 32. The valve arrangement is controlled by the process control 42.

High pressure raw source gas 12 enters the system at above the critical predetermined pressure. High pressure raw source gas 12 is able to maintain a pressure drop across the membrane 32 sufficient to separate the permeate gas 36 from the retentate gas 34. To achieve this, process valves 81, 82, 83, are open. At the same time, process valves 84, 85, 86, are closed. This selectively connected valve arrangement routes the natural gas through the membrane 32 before entering the gas compressor 56. The permeate gas 36 must be boosted because of pressure drop across the membrane 32. The valve arrangement is controlled by the process control 42.

The predetermined pressure of the raw source gas 12 entering the natural gas processing system 10 is defined as approximately 400 PSIG. This can vary with ambient air temperature and pressure. This can also vary with customer piping arrangement. For example, if the piping exhibits high pressure drop, the predetermined pressure setpoint can be adjusted upward to ensure sufficient pressure entering the system. Those skilled in the art will selectively adjust the predetermined pressure according to conditions at the site. The process control 42 will automatically adjust the valve arrangement according to the predetermined pressure of the raw source gas 12 entering the natural gas processing system 10.

The gas compressor 56 is selectively connected in fluid communication with the membrane 32 in either one of two ways. One possible connection is upstream of the membrane 32 in order to compress the natural gas before entering the membrane 32. This is in the event that a pressure of the raw source gas 12 entering the natural gas processing system 10 is less than the predetermined pressure.

The alternative connection is downstream of the membrane 32 so as to compress the natural gas after exiting the membrane 32. This is in the event that the pressure of the raw source gas 12 entering the natural gas processing system 10 is greater than the predetermined pressure.

A gas compressor scrubber 54 removes contaminants from the natural gas entering the gas compressor 56. This is especially necessary in the case of low pressure raw source gas 12 which enters the gas compressor 56 before the particulate filter 30.

A first pressure control valve 70 is connected in fluid communication with the membrane 32 and the gas compressor 56. The first pressure control valve 70 is upstream of the gas compressor 56 and operatively connected to the process control 42 for controlling a pressure of the natural gas entering the gas compressor 56.

A second pressure control valve 72 is connected in fluid communication with the membrane 32. The second pressure control valve 72 is installed downstream of the membrane 32. The second pressure control valve 72 is operatively connected to the process control 42 for controlling the pressure of the natural gas downstream of the membrane 32. The natural gas downstream of the membrane 32 in this case is the retentate gas 34. The retentate gas 34 flows through a retentate valve 50 and a flow meter 74 and exits the system through the retentate gas outlet 52.

A permeate gas outlet 37 allows the permeate gas 36 to exit the natural gas processing system 10. The permeate gas 36 can be used to fuel engines for auxiliary equipment, as described above. The permeate gas 36 remains in a gaseous form and is injected back into the pipeline from which it was sourced in its raw form. This eliminates the complications of storing gas or liquid permeate onsite or removing via truck. There is no longer any justification for wasteful flaring of gas.

An electrical generator 76 is juxtaposed with the mobile platform 18. The electrical generator 76 is preferably mounted on the mobile platform 18. However, it can be on a separate skid. The electrical generator 76 supplies process electricity. The electrical generator 76 is powered by the natural gas.

An air compressor 58 is mounted on the mobile platform 18 for supplying process compressed air 68. The air compressor 58 is driven by an air compressor electric motor 60, and is powered by electricity from the electrical generator 76. The air compressor 58 is operatively connected to the electrical generator 76. The air compressor 58 is connected in fluid communication with a compressed air storage tank 62, air filters 64, and air pressure regulator 66.

The process control 42 is operatively connected to the source natural gas valve 28, the retentate valve 50, the first temperature control valve 40, the second temperature control valve 48, the first pressure control valve 70, the second pressure control valve 72, the gas compressor, the electrical generator 76, and the air compressor 58. The process control 42 is operatively connected to all the controllable valves and instruments. The process control 42 controls the natural gas processing system 10. The selective connections are controlled by the process control 42.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A natural gas processing system for use in connection with a natural gas source and raw source natural gas produced by the source, the natural gas processing system comprising:

a mobile platform adapted for being transported to the natural gas source;

a liquid removal tank juxtaposed with the mobile platform, the liquid removal tank being adapted for attachment in fluid communication to the natural gas source for receiving the source natural gas, the liquid removal tank being adapted for separating liquid contaminants from the source natural gas, the liquid removal tank being adapted for allowing passage of the natural gas therethrough;

a particulate filter mounted on the mobile platform, the particulate filter being connected downstream of and in fluid communication with the liquid removal tank, the particulate filter being adapted for removing particulate matter from the natural gas, the particulate filter being adapted for allowing passage of the natural gas therethrough;

a membrane mounted on the mobile platform, the membrane being connected downstream of and in fluid communication with the particulate filter, the membrane being adapted for separating the natural gas into a retentate gas and a permeate gas, the membrane being adapted for allowing passage of the permeate gas therethrough, and restricting passage of the retentate gas therethrough;

a gas compressor mounted on the mobile platform, the gas compressor being connected in fluid communication with the membrane, the gas compressor being adapted for compressing the natural gas and allowing passage of the natural gas therethrough, the gas compressor being driven by a first power source;

a source natural gas valve connected in fluid communication with the natural gas source and the liquid removal tank for controlling the source natural gas entering the liquid removal tank;

a retentate valve connected downstream of and in fluid communication with the membrane for controlling the retentate gas exiting the natural gas processing system; and a process control operatively connected to at least the source natural gas valve and the retentate valve for controlling the natural gas processing system.

2. The natural gas processing system of claim 1, further comprising selective connections of the gas compressor upstream of the membrane and downstream of the membrane, the selective connections being controlled by the process control, wherein the gas compressor is selectively connected in fluid communication with the membrane in a one of:

upstream of the membrane so as to compress the natural gas before entering the membrane, wherein a pressure of the source natural gas entering the natural gas processing system is less than a predetermined pressure; and downstream of the membrane so as to compress the natural gas after exiting the membrane, wherein the pressure of the source natural gas entering the natural gas processing system is greater than the predetermined pressure.

3. The natural gas processing system of claim 1, further comprising a first pressure control valve connected in fluid communication with the membrane and the gas compressor for controlling a pressure of the natural gas entering the gas compressor.

4. The natural gas processing system of claim 1, further comprising a second pressure control valve connected in fluid communication with the membrane for controlling a pressure of the natural gas downstream of the membrane.

5. The natural gas processing system of claim 1, wherein the first power source is selected from the group consisting of: natural gas; permeate gas; diesel fuel; gasoline; and electricity.

6. The natural gas processing system of claim 1, further comprising an air compressor mounted on the mobile platform for supplying process compressed air, the air compressor being driven by a second power source, the air compressor being operatively connected to the process control.

7. The natural gas processing system of claim 6, wherein the second power source is selected from the group consisting of: natural gas; permeate gas; diesel fuel; gasoline; and electricity.

8. The natural gas processing system of claim 1, further comprising an electrical generator juxtaposed with the mobile platform for supplying process electricity, the electrical generator being driven by a third power source, the electrical generator being operatively connected to the process control.

9. The natural gas processing system of claim 8, wherein the third power source is selected from the group consisting of: natural gas; permeate gas; diesel fuel; and gasoline.

10. The natural gas processing system of claim 1, further comprising:
    a first heat exchanger mounted on the mobile platform, the first heat exchanger being connected in fluid communication with the membrane, the first heat exchanger being upstream of the membrane, for changing a temperature of the natural gas entering the membrane; and
    a first temperature control valve connected in fluid communication with the first heat exchanger and the membrane, the first temperature control valve being upstream of the first heat exchanger, the first temperature control valve being operatively connected to the process control for controlling the temperature of the natural gas entering the membrane.

11. The natural gas processing system of claim 10, wherein the first temperature control valve is adapted to proportionately divide the flow of the natural gas between the first heat exchanger and the membrane in proportion to the temperature of the natural gas entering the first temperature control valve, thereby controlling the temperature of the natural gas entering the membrane.

12. The natural gas processing system of claim 1, further comprising:
    a second heat exchanger mounted on the mobile platform, the second heat exchanger being connected in fluid communication with the membrane for changing a temperature of the natural gas downstream of the membrane; and
    a second temperature control valve connected in fluid communication with the membrane and the second heat exchanger, the second temperature control valve being operatively connected to the process control for controlling the temperature of the natural gas downstream of the membrane.

13. The natural gas processing system of claim 12, wherein the second temperature control valve is adapted to proportionately divide the flow of the natural gas between the second heat exchanger and the retentate valve in proportion to the temperature of the natural gas entering the second temperature control valve, thereby controlling the temperature of the natural gas downstream of the membrane.

14. The natural gas processing system of claim 1, wherein the processing system is adapted to process the source natural gas having the properties of:
    a pressure range of from 50 psig to 1200 psig;
    a temperature range of from 40° F. to 120° F.; and
    a BTU composition range from 1,100 BTU to 1,400 BTU; and wherein
    the source natural gas saturation levels are at dewpoint.

15. The natural gas processing system of claim 1, wherein the processing system is adapted to process the source natural gas having the properties of:
    a pressure range of from atmospheric pressure to 2400 psig;
    a temperature range of from 30° F. to 180° F.; and
    a BTU composition range from 950 BTU to 1800 BTU; and wherein
    the source natural gas saturation levels are at dewpoint.

16. The natural gas processing system of claim 1, further comprising a condensate tank in fluid communication with the liquid removal tank, the particulate filter, the membrane, and the gas compressor, for collecting water and contaminants.

17. The natural gas processing system of claim 1, wherein the particulate filter is adapted for removing water vapor from the natural gas.

18. A natural gas processing system for use in connection with a natural gas source and raw source natural gas produced by the source, the natural gas processing system comprising:
    a mobile platform adapted for being transported to the natural gas source;
    a liquid removal tank juxtaposed with the mobile platform, the liquid removal tank being adapted for attachment in fluid communication to the natural gas source for receiving the source natural gas, the liquid removal tank being adapted for separating liquid contaminants from the source natural gas, the liquid removal tank being adapted for allowing passage of the natural gas therethrough;
    a source natural gas valve connected in fluid communication with the natural gas source and the liquid removal tank for controlling the source natural gas entering the liquid removal tank;
    a particulate filter mounted on the mobile platform, the particulate filter being connected downstream of and in fluid communication with the liquid removal tank, the particulate filter being adapted for removing particulate matter from the natural gas, the particulate filter being adapted for allowing passage of the natural gas therethrough;
    a membrane mounted on the mobile platform, the membrane being connected downstream of and in fluid communication with the particulate filter, the membrane being adapted for separating the natural gas into a retentate gas and a permeate gas, the membrane being adapted for allowing passage of the permeate gas therethrough, and restricting passage of the retentate gas therethrough;

a retentate valve connected downstream of and in fluid communication with the membrane for controlling the retentate gas;

a gas compressor mounted on the mobile platform, the gas compressor being connected in fluid communication with the membrane, the gas compressor being adapted for compressing the natural gas and allowing passage of the natural gas therethrough, the gas compressor being powered by the natural gas, the gas compressor being adapted for selective connections upstream of the membrane and downstream of the membrane, wherein the gas compressor is selectively connected in fluid communication with the membrane in a one of:

upstream of the membrane so as to compress the natural gas before entering the membrane, wherein a pressure of the source natural gas entering the natural gas processing system is less than a predetermined pressure; and downstream of the membrane so as to compress the natural gas after exiting the membrane, wherein the pressure of the source natural gas entering the natural gas processing system is greater than the predetermined pressure;

an electrical generator juxtaposed with the mobile platform for supplying process electricity, the electrical generator being powered by the natural gas;

an air compressor mounted on the mobile platform for supplying process compressed air, the air compressor being operatively connected to the electrical generator and powered by electricity from the electrical generator; and a process control operatively connected to the source natural gas valve, the retentate valve, the gas compressor, the electrical generator, and the air compressor, for controlling the natural gas processing system, wherein the selective connections are controlled by the process control.

19. The natural gas processing system of claim 18, further comprising a first pressure control valve connected in fluid communication with the membrane and the gas compressor, the first pressure control valve being upstream of the gas compressor and operatively connected to the process control for controlling a pressure of the natural gas entering the gas compressor.

20. The natural gas processing system of claim 18, further comprising a second pressure control valve connected in fluid communication with the membrane, the second pressure control valve being downstream of the membrane and operatively connected to the process control for controlling a pressure of the natural gas downstream of the membrane.

21. The natural gas processing system of claim 18, further comprising:

a first heat exchanger mounted on the mobile platform, the first heat exchanger being connected in fluid communication with the membrane, the first heat exchanger being upstream of the membrane, for changing a temperature of the natural gas entering the membrane; and a first temperature control valve connected in fluid communication with the first heat exchanger and the membrane, the first temperature control valve being upstream of the first heat exchanger, the first temperature control valve being operatively connected to the process control for controlling the temperature of the natural gas entering the membrane.

22. The natural gas processing system of claim 21, wherein the first temperature control valve is adapted to proportionately divide the flow of the natural gas between the first heat exchanger and the membrane in proportion to the temperature of the natural gas entering the first temperature control valve, thereby controlling the temperature of the natural gas entering the membrane.

23. The natural gas processing system of claim 18, further comprising:

a second heat exchanger mounted on the mobile platform, the second heat exchanger being connected in fluid communication with the membrane for changing a temperature of the natural gas downstream of the membrane; and a second temperature control valve connected in fluid communication with the membrane and the second heat exchanger, the second temperature control valve being operatively connected to the process control for controlling the temperature of the natural gas downstream of the membrane.

24. The natural gas processing system of claim 23, wherein the second temperature control valve is adapted to proportionately divide the flow of the natural gas between the second heat exchanger and the retentate valve in proportion to the temperature of the natural gas entering the second temperature control valve, thereby controlling the temperature of the natural gas downstream of the membrane.

* * * * *